(12) United States Patent
Guenther et al.

(10) Patent No.: US 8,726,091 B2
(45) Date of Patent: May 13, 2014

(54) TROUBLESHOOTING SYSTEM FOR INDUSTRIAL CONTROL PROGRAMS

(75) Inventors: Robert Guenther, Linden (DE); Steven A. Zuponcic, Solon, OH (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 308 days.

(21) Appl. No.: 13/168,187

(22) Filed: Jun. 24, 2011

(65) Prior Publication Data

US 2012/0331352 A1 Dec. 27, 2012

(51) Int. Cl.
*G06F 11/00* (2006.01)
(52) U.S. Cl.
USPC ............ 714/38.1; 714/46; 714/57; 702/59; 702/183; 702/185; 716/112; 716/113
(58) Field of Classification Search
None
See application file for complete search history.

(56) References Cited

U.S. PATENT DOCUMENTS

| | | | |
|---|---|---|---|
| 6,788,218 B2 * | 9/2004 | Sudolcan | 340/870.16 |
| 6,853,920 B2 * | 2/2005 | Hsiung et al. | 702/1 |
| 7,831,411 B2 * | 11/2010 | Reichard et al. | 702/183 |
| 2007/0185686 A1 * | 8/2007 | Singhal et al. | 702/185 |
| 2012/0330452 A1 * | 12/2012 | Guenther et al. | 700/110 |

* cited by examiner

*Primary Examiner* — Christopher McCarthy
(74) *Attorney, Agent, or Firm* — Boyle Fredrickson, S.C.

(57) ABSTRACT

A system for troubleshooting control programs employs an event log that captures the values of inputs to outputs from the control program only at event times determined by changes in input or output data. The program allows the event log to be reviewed in jumps to only events which cause a change in output value of an instruction or particular change in output value of a particular instruction, greatly simplifying the troubleshooting process. The event log records a particular instruction instance associated with the event permitting the operation of the program to be studied in reverse order. The event log may also record a timestamp of the event allowing time stamped data from different devices to be synchronized with the review of the events.

20 Claims, 6 Drawing Sheets

| EVENT | TIME | INSTR. | DATA NAME | NEW VALUE |
|---|---|---|---|---|
| 201 | 0000 125 | 1.1 | ENCODER 1 | 128.5 |
| 202 | 0000 322 | 4.1 | SENSOR 12 | 111.8 |
| 203 | 0000 325 | 5.1 | SENSOR 10 | 32.0 |
| 204 | 0000 410 | 1.2 | ENCODER 1 | 130.2 |
| 205 | 0000 420 | 2.2 | OUTPUT 4 | TRUE |
|  |  |  | SENSOR 3 |  |

TROUBLESHOOTING SYSTEM FOR INDUSTRIAL CONTROL PROGRAMS

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to a troubleshooting tool that simplifies the isolation and diagnosis of control program or hardware errors in industrial control systems.

Industrial controllers are special purpose computers used for controlling industrial processes and manufacturing equipment on a real-time basis. Under the direction of a stored control program, the industrial controller examines a set of inputs reflecting the status of the controlled process ("physical inputs") and internal variables indicating the results of other instructions at a series of program instructions. Based on those inputs, the same or different program instructions change a set of outputs controlling the industrial process ("physical outputs") and internal variables affecting other instructions. Normally, the instructions are repeated in a "scan" to provide for real-time control.

The ability to troubleshoot control programs is of great importance in industrial control where the majority of control programs have extensive customization or are wholly unique.

To aid in troubleshooting the control program, the operation of the control program and the values of its inputs and outputs and internal variables can be graphically displayed, during live operation of the control system, using a human machine interface (HMI). This display may be in the form of an animation depicting instructions being executed and numeric or symbolic representations of the input and output values.

Often it is desirable or necessary to troubleshoot the operation of the control program at a later time or "off-line". This can be particularly important if the program fault risks or causes machine damage or if the fault is intermittent and it is economically desirable to continue the controlled process while the faulting is investigated. For this purpose it is known to use "historian" devices to record the inputs and outputs and internal variables of the control program during operation of the industrial process. This data may then be reviewed to gain insight into the operation of the control program and its interaction with the industrial process.

U.S. Pat. No. 7,831,411 assigned to the same assignee as the present invention and hereby incorporated by reference, describes a system that synthesizes the advantages of a real-time monitoring tool using an HMI and a historian service to allow off-line analysis of the control program such as reveals detailed execution of the control program. This invention captures the input and output data and internal variables of the control program and then provides it to a working copy of the control program to produce an animation similar to that provided in the live monitoring described above. Data from different sources may be time stamped so that the different data may be synchronized during this replaying process Sorting through all of the input and output data associated with even a moderately complex industrial control system can be difficult or impractical. Common input devices such as optical encoders produce a high-bandwidth stream of constantly changing high-resolution data that must be stored and reviewed. Using this data to animate a control program can often produce an opaquely complex display. The ability to focus on a particular defect in the control program, by animating only a short portion of the control program, is hampered by the fact that execution of a control program is affected not only by its current input and output data but by so-called "state or internal variables" determined by historical execution of the control program from the time of its first activation. Generally animation of a control program by execution of the control program using stored data can only occur in the forward direction, making it cumbersome to track down the antecedents of faults.

BRIEF SUMMARY OF THE INVENTION

The present invention provides an improved troubleshooting tool that helps the user focus on the most significant captured data, review only portions of the control program and portions of its execution that are closely related to the fault condition, and move freely forward and backward through the execution of the program to rapidly isolate causes of a fault condition.

In one embodiment, data from physical inputs to the control program are displayed in a data "event" only when changes in the physical inputs produce a change in the output of an instruction. In this way streams of irrelevant data may be ignored. Each data "event" can be linked to an instance of execution of an instruction of the control program, allowing the execution point of the control program to be stepped forward or backward without replaying the data as would be required in a simulation. By time stamping each data event, analysis of the instructions at each data event may be synchronized with other data sources, for example high-speed video, to allow additional fault analysis capabilities.

Specifically, the present invention provides a program for troubleshooting a control program of a type comprised of instructions receiving input data from variables of the control program and measurements of physical inputs from an industrial process and providing output data to variables of the control program and output signals controlling the industrial process. The program operates to display a given instruction showing a value of input data for the given instruction at a first time; and to accept a step instruction from a user changing the output on the display of the given instruction to jump to a second time showing at input data at the second time, the second time being a time of change of output data by an instruction of the control program.

It is thus a feature of at least one embodiment of the invention to provide a practical system for analyzing the operation of a control program. By jumping among data values that have caused a change in the output of an instruction, large amounts of data that does not affect the controlled process may be skipped, simplifying the review.

The step instruction from a user changing the output on the display of the given instruction to jump to a second time showing at input data at the second time, may use a second time that is before the first time.

It is thus a feature of at least one embodiment of the invention to permit the program to be reviewed in reverse execution order on a step-by-step basis. Typical data historian systems that record environmental variables may be used to run a control program in a forward direction by applying a sequence of recorded inputs to the controller for simulated execution; however, applying the environmental variables in the reverse order will not cause the program to execute in reverse. By linking data inputs to the instructions, however, the instructions may be stepped backward as earlier data inputs are examined.

The given instruction may be an instruction producing a changed output variable triggering a detected fault of the computer program.

It is thus a feature of at least one embodiment of the invention to automatically display the instruction at which a fault is detected to begin a troubleshooting section.

The program may further execute to identify other instructions providing outputs to variables consumed by the given instruction and to display the other instructions also showing a value of at least one measurement of data input to the other instructions.

It is thus a feature of at least one embodiment of the invention to permit an abbreviated display form showing only those instructions related to the fault condition.

The second time, to which the user may step the display, may be limited only to times when there is a change of a variable of the control program by an instruction that is being output on the display or provides output data to the given instruction.

It is thus a feature of at least one embodiment of the invention to permit the user to step to data changes that are relevant only to the displayed instructions or that are related to the detected fault.

The program may communicate with a program log providing a list of events recording changes of physical inputs from the industrial process only at times of change of a the physical inputs.

It is thus a feature of at least one embodiment of the invention to provide a system that minimizes data storage burdens.

The program log may include a time stamp for each change of physical inputs from the industrial process or each change of an internal variable at times of change of the input or variable by an instruction and the program may further display other time stamped data having a timestamp equal to the first time.

It is thus a feature of at least one embodiment of the invention to permit the troubleshooting display to integrate other helpful data, for example data from a high-speed video camera.

The program may further execute to display the value of the input or output data associated with the given instruction at multiple successive executions of the given instruction. These successive executions may be displayed as a graph depicting variations in the physical input or variable plotted against times of the multiple successive executions.

It is thus a feature of at least one embodiment of the invention to permit trending analysis of data that may be helpful in troubleshooting.

The foregoing and other aspects of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

Hardware

Figure 1:
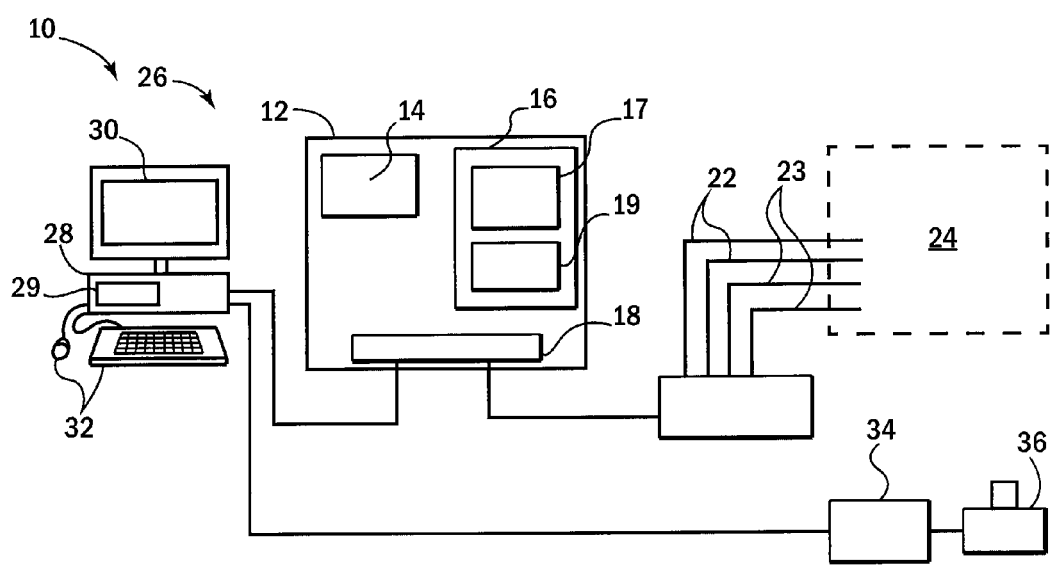
FIG. 1 is a simplified block diagram of a control system of the present invention showing a programmable logic controller for controlling I/O modules receiving physical inputs from and transmitting physical outputs to a controlled process according to a control program held within the programmable logic controller, the programmable logic controller further communicating with a user terminal providing displays and receiving user inputs for troubleshooting the control program, and an event log collected by the programmable logic controller, and further showing a high-speed camera such as may augment the troubleshooting process.

Referring to FIG. 1, a control system 10 may provide a programmable logic controller 12 including a processor 14 and memory 16. The memory may hold a control program 17 comprised of program instructions and an event log 19 as will be described. The processor 14 and memory 16 may intercommunicate on an internal bus which may join with an interface 18.

Generally, the interface 18 may connect to one or more input/output modules 20 receiving physical input signals 23 (physical inputs) from sensors on machinery of the controlled process 24, and outputting physical output signals 22 (physical outputs) to actuators on machinery of the controlled process 24. These latter output signals are set by instructions of the control program 17 accordingly to receive physical inputs and output variables of other instructions.

The interface 18 may also communicate with the user terminal 26 having a processor unit 28 (holding a processor, memory, and the like per a standard personal computer) communicating with a display screen 30 for displaying various displays as will be described and communicating with user input devices 32 such as a mouse and keyboard permitting user input.

The processor unit 28 may also communicate with a historian unit 34 (such as a data logger) to receive recorded data associated with the controlled process 24 from other devices, for example a high-speed video camera 36 documenting a portion of the controlled process 24. The data from the historian unit 34 may be time stamped with times of its acquisition and may be of any character including video frames or values of input signals 23 or the like.

The processor unit 28 may also hold an internal troubleshooting program 29 that may be executed by the processor unit 28 to provide for functionality to be described below with respect to the present invention.

An Example Control Program and Controlled Process

Figure 2:
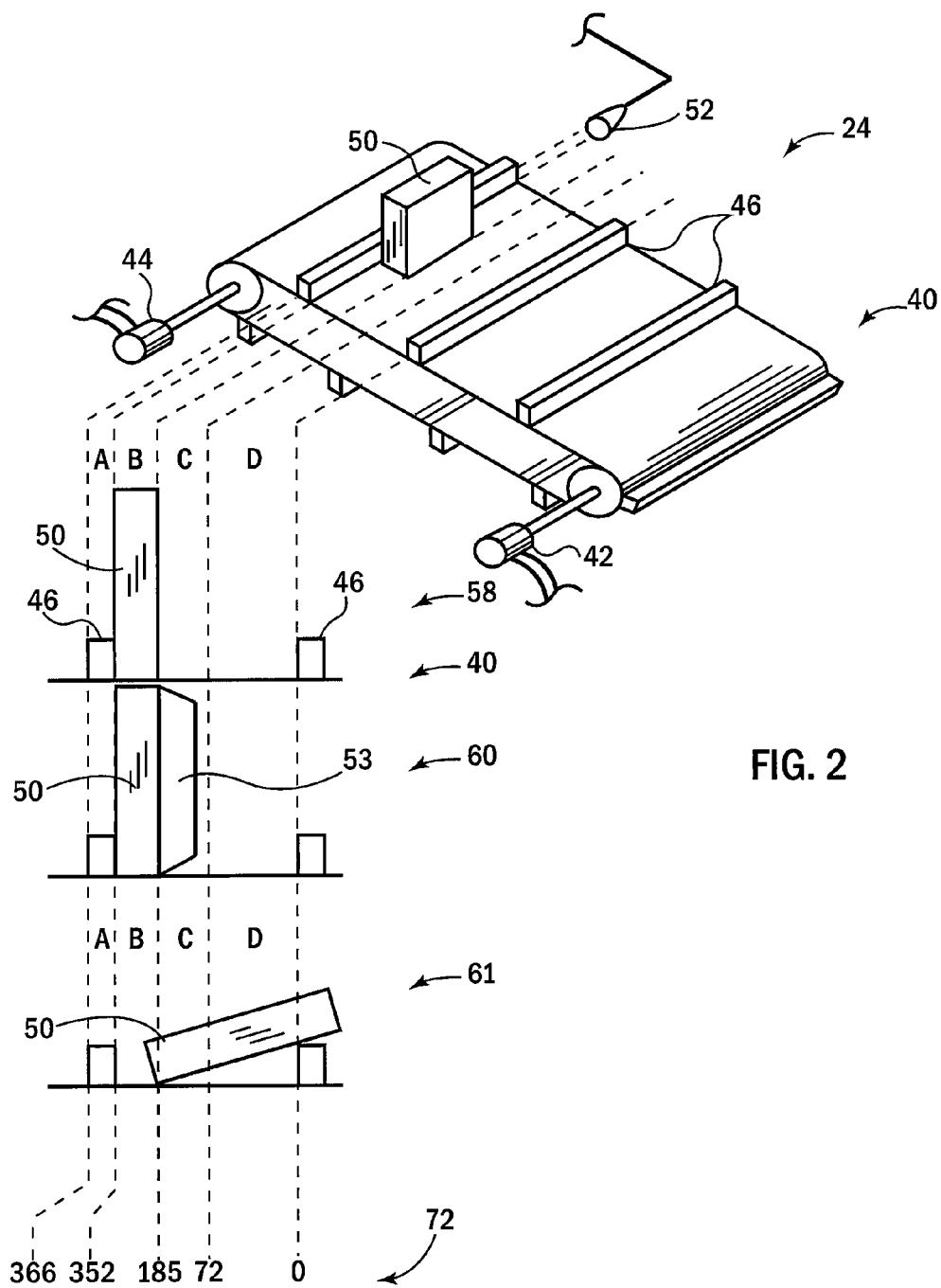
FIG. 2 is a perspective view of a conveyor belt providing an example controlled process in which multiple zones or channels are monitored using a photodetector and rotary encoder and showing the channel superimposed on a side elevational view of the conveyor belt in various situations of: proper product alignment, product carton flap door open, and fallen product.

Referring now to FIG. 2, an example controlled process 24 may provide for a conveyor belt 40 driven by a motor 42 that may be controlled by one of the output signals 22. The motor 42 may move the upper surface of the conveyor belt 40 at a controlled velocity in a predetermined direction (left to right in the example of FIG. 2). A position encoder 44 attached to the conveyor belt 40 may monitor the position of the conveyor belt 40 to provide input signals 23 to the programmable logic controller 12 through the I/O modules 20. The upper surface of the conveyor belt 40 may include flight bars 46 serving to align product container 50 on the surface of the conveyor belt 40 at regular locations. A photodetector system 52 (only one photo receiver shown) may detect the presence of the product container 50 or other objects on the upper surface of the conveyor belt 40 as the conveyor belt 40 moves and provide an input signal 23 to the controller 12 through I/O modules 20.

Referring still to FIG. 2, in one embodiment, the control program 17 and photodetector system 52 cooperate to define various zones relative to the flight bars 46 on the surface of the conveyor belt 40. In this example, a first zone A begins at a leftmost edge of the flight bar 46 and ends at the beginning of a second zone B at the right edge of the flight bar 46. A third zone C begins just beyond the extent of a product container 50 having its leftmost edge abutting the rightmost edge of the flight bar 46. A fifth zone D begins just beyond the extent of the range of an open flap 53 of the product container 50 and continues to the beginning of the next zone A.

It will be appreciated that an obstruction of the zones A-D may be used to detect a number of situations related to the orientation of the product container 50. In a first situation 58, there is proper placement of product container 50 on the conveyor belt 40 so that the product container 50 abuts the flight bar 46 and is detected in zone B and not elsewhere. As shown in situation 60, a product flap 53 being open may be detected by sensing of an obstruction in zone C. A fallen product may be detected by an obstruction in zones A, B, and C per situation 61.

Figure 3:
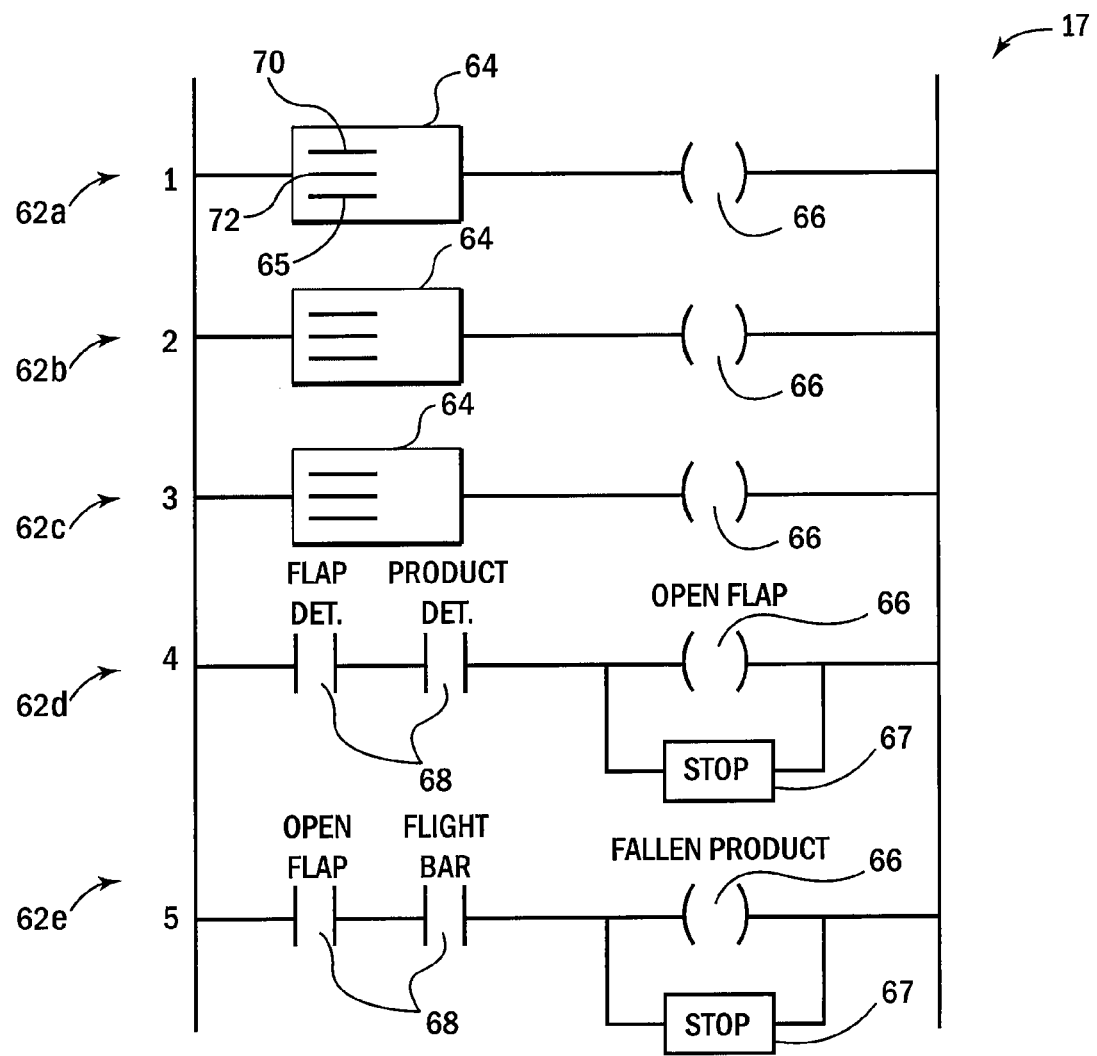
FIG. 3 is a ladder logic diagram of a control program that may be used to monitor the conveyor belt of FIG. 2.

Referring now to FIGS. 2 and 3, a portion of a control program 17 used to identify situations 58, 60 and 61 may be implemented in relay ladder language. As will be understood in the art, relay ladder logic provides a graphic program language in which instructions are represented by interconnected electrical components such as contacts, coils and function blocks. The electrical components are connected in series or parallel in a set of rungs extending from a left power rail to a right power rail (represented by vertical lines) and control flow is represented by the passage of electricity in the rung. Generally the rungs are scanned (executed) in repeated loop from top to bottom.

The control program 17 may include a first rung 62a (henceforth also termed an instruction) having a limit-switch function block 64 receiving physical input 72 from the encoder 44 and the photodetector system 52 of FIG. 2 to detect light interruption in zone A and to activate an output variable 66 designated with the tag "flight bar" if that interruption occurs. Per relay ladder logic convention, output variables are represented by relay coil symbols. As will be understood in the art, the limit-switch function block 64 accepts a user-defined high limit 65 and a low limit 74 such that when the signal from the encoder 44 is between these ranges, upon interruption of the light signal to photodetector system 52, the limit switch function block will activate output variable 66 of a "flight bar". In this case, the lower limit may be 352 and the upper limit 366 defining zone A in terms of encoder values. A graphic depiction of this limit-switch function block 64 to be described below may display these limits and also the values of physical inputs 72 such as provided by the encoder 44.

A second rung 62b may also provide a limit-switch function block 64 defining zone B and having a lower limit of 185 and an upper limit of 352 to set an output variable 66 designated "product detection" when the light beam is interrupted in this zone.

A third rung 62c may provide a limit-switch function block 64 with a lower limit of 72 and an upper limit of 185 to detect the open flap 53 to set an output variable 66 of "flap detect".

A fourth rung 62d may provide for an input variable 68 of "flap detect" with the value provided by the "flap detect" output variable 66 of rung 62c.

This input variable 68 of "flap detect" is represented by a normally open contact symbol in relay ladder logic and is in series with a normally open contact representing the input variable 68 designated "product detect" which in turn communicates with an output variable 66 of "open flap". Thus both the "flap detect" and "product detect" input variables 68 must be true to set the "open flap" output variable to true. A stop instruction 67 may be placed in parallel with the "open flap" output variable 66 to be activated when the "open flap" variable is set indicating an error condition. The stop instruction 67, as will be discussed below, causes a termination of data logging for the event log 19 during execution of the control program 17 on the programmable logic controller 12.

The fifth rung 62e may provide input variables 68 of "open flap" and "flight bar" (obtained from output variables 66 of rungs 62a and 62b) both represented by normally open contacts symbols and connected in series to output variable 66 of "fallen product". A stop instruction 67 may also be placed across this output variable 66 of "fallen product" which also represents a fault condition. It will be appreciated from this description that the "open flap" output variable 66 will change from false to true in the situation 60 shown in FIG. 2 where the light beam is blocked in regions B and C. On the other hand, the "fallen product" output variable 66 changes from false to true when regions B, C and A are occluded.

Creating an Event Log

Figures 4, 5:
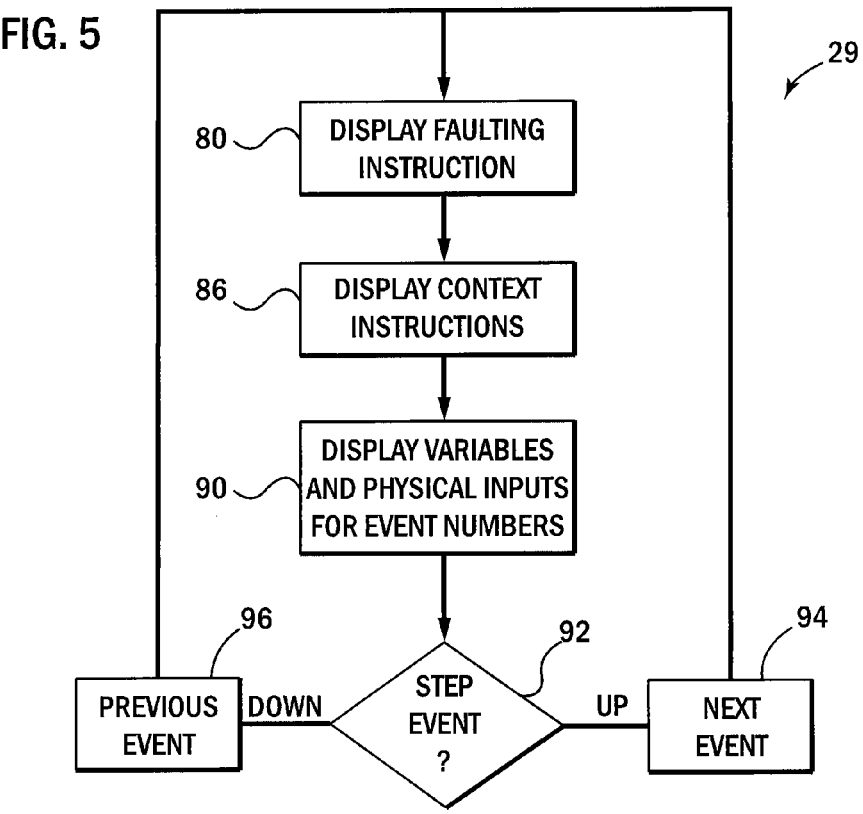
FIG. 4 is a graphical representation of an event log that may be prepared by the programmable logic controller of FIG. 1 capturing changes in input or output data as linked to a particular instruction instances.
FIG. 5 is a flowchart of a troubleshooting program that may be executed on the user terminal of FIG. 1 to analyze operation of the control program using the event log.

Referring now to FIGS. 1 and 4, during execution of the control program 17, the programmable logic controller 12 may capture the state of the control system 10 as represented by physical inputs 72 and variables 68 and 66 of the control program 17 at various times in event log 19. These times will typically be limited to times at which sampled input data (physical inputs and internal variables) or output data (physical output or internal variables) change, thus reducing the amount of data that needs to be stored. Generally the event log 19 captures sequential events 74 (represented as rows in the table of FIG. 4). Each event 74 provides a number of fields represented by columns of the table of FIG. 4 including an event number 87, being a simple sequential number to distinguish events, and a time value 95 provided by a high accuracy global clock typically having a resolution of less than 10 microseconds the time of the event, for example using the IEEE 1588-2002 standard. In addition each event 74 may be linked to a particular instruction instance 89 identifying, for example, a particular instruction (rung 62) of the control program 17 together with its instance of execution associated with changed data when the data is output data. Thus, for example, the first time an instruction 1 is executed, it may be designated 1.0 whereas a second time of execution may be designated 1.1.

As will be discussed below, this event log 19 will generally be a circular buffer of finite size in which data is recorded sequentially until the end of the buffer and then begins again at the top of the buffer to overwrite previously saved data. In this way the total amount of data storage requirements is further limited.

A method of generating this event log 19 is described in co-pending application for Capturing Data During Operation of an Industrial Controller for the Debugging of Control Programs, by the same inventors, filed on even date herewith, hereby incorporated by reference in which the programmable controller 12 executes a routine triggered by the change of any input or output data to or from a rung 62. This process may be performed with reduced taxation to the processor 14 of the programmable controller 12 (shown in FIG. 1) by exploiting a memory management unit (not shown) to detect memory changes.

It will be appreciated however, that a number of other logging techniques can be implemented including performing this detection wholly in software, and/or through the use of multi-processing techniques. Other methods of generating the event log are also contemplated including distributed collection of data by different devices that may be synchronized by common timestamps from a global clock or capturing data only if the output of an instruction changes.

Generally the logging process will stop when a stop instruction 67 is executed and a fault occurs. The event log 19 may then be reviewed to determine the basis for the error. In one embodiment, input data may be logged only upon changes of output data. The data logging may continue for predetermined time or number of events after the stop instruction 67.

The Troubleshooting Program

Figure 6:
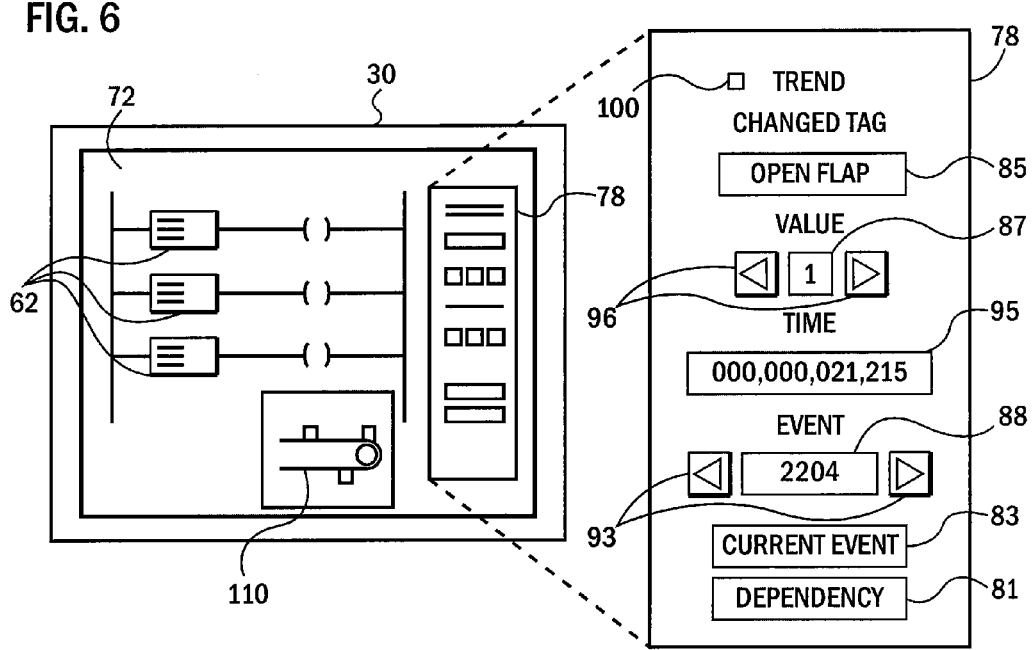
FIG. 6 is a screen shot of the user terminal displaying instructions of the control program and the instruction's physical input values, and providing a troubleshooting control panel permitting the user to step through events of the event log.

Referring now to FIGS. 1 and 6, the event log 19, after being captured by the controller 12, may be transferred to the processor unit 28 for analysis by the troubleshooting program 29. Generally the troubleshooting program 29 will provide, on the display screen 30, a display 77 of particular rungs 62 of the control program 17 relevant to the fault triggering the stop instruction 67 described above and may provide for a troubleshooting control panel 78 for reviewing the event log 19 through user commands.

In an example describing the operation of the troubleshooting program 29, it will be assumed that an open flap fault has been detected (per rung 62*d* of FIG. 3), causing the industrial control system 10 to fault, and yet inspection of the product container 50 (per FIG. 2) shows that there is no open flap on the product container.

Figure 8:
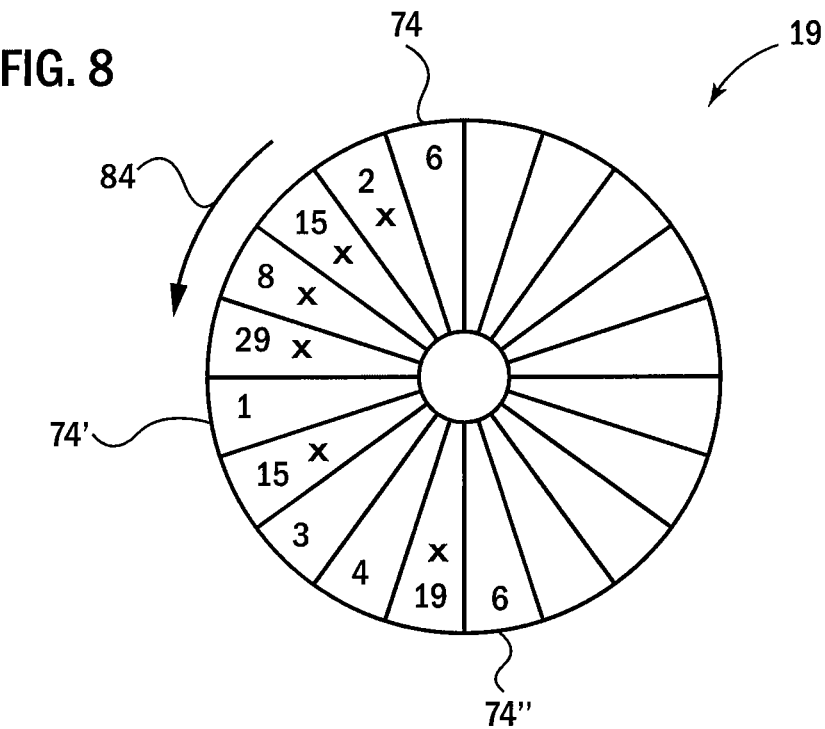
FIG. 8 is a graphical depiction of a circular buffer used to hold the event log of FIG. 1 showing the process of stepping through events of the event log using the controls of FIG. 6.

Referring now to FIG. 5, in a first step 80 of the troubleshooting program 29 the faulting instruction (being the instruction holding the stop instruction 67 triggering the fault) will be identified. Referring to FIG. 8, this faulting instruction may be determined from the event log 19, here represented as a circular buffer filled in a counterclockwise direction 84, as the last event 74 entered into that circular buffer representing the change in the output value 66 of the rung 62 triggering the stop instruction 67. In the case that the logging process is continued after the stop instruction 67, a separate flag may be entered into the event log 19. The event 74 from the event log 19 associated with the faulting rung 62 may be used to identify a "fault time" (equal to the time 95) as will be used as described below to provide values of input and output variables for the displayed rungs 62.

Referring momentarily to FIG. 6, the name 85 of the changed output variable 66 of the faulting instruction of the given event may be displayed in a text box, in this case "open flap". The value 87 of that output instruction (one) may be shown at a text box as well as the time value 95 associated with that event as well as the event number 88. As also shown in FIG. 6, a current event rung button 83 may be pressed in the control panel 78 to refocus the display 77 on this rung at any time during the following steps.

Referring again to FIG. 5, after the faulting instruction of rung 62*d* is displayed, it is determined, at next process block 86, what additional instructions surrounding that faulting instruction should be displayed. Most simply, these additional instructions may be those rungs 62 preceding the rung 62*d* of the faulting instruction in the rung order of the control program 17 as written.

Displaying Only Related Instructions and Data

Referring momentarily to FIG. 6, alternatively a dependency button 81 may be pressed by the user which will cause a filtering process to be invoked to display only rungs 62 that produce output variables 66 contributing to the execution of the faulting rung 62*d*, that is data values consumed by the faulting rung 62*d* or by other rungs providing output variables 66 consumed by the faulting rung 62*d*.

Figure 7:
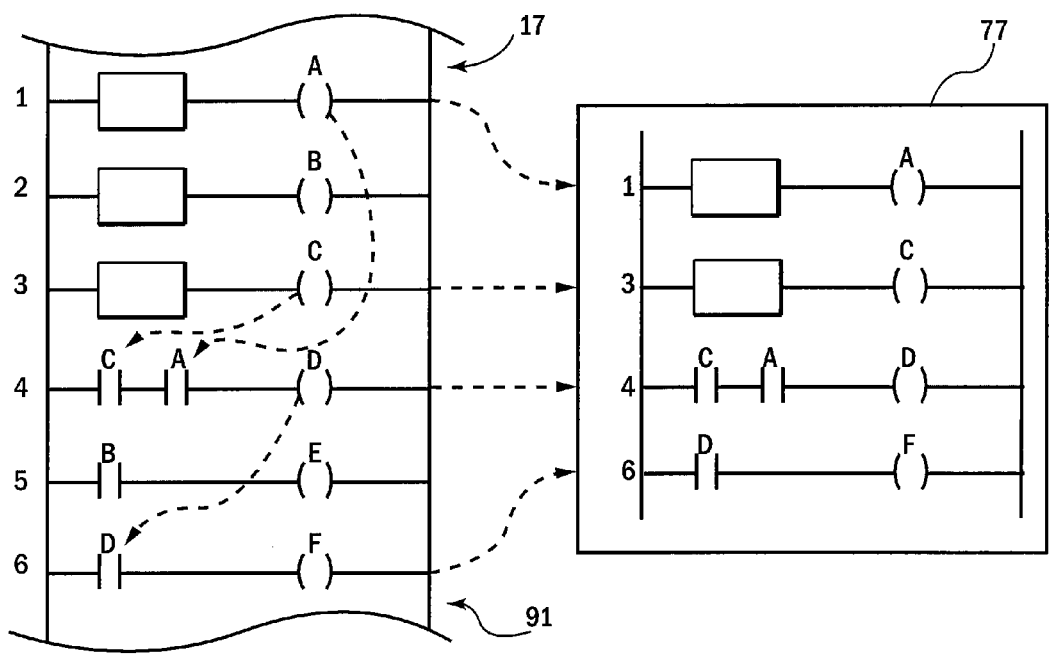
FIG. 7 is a diagram depicting operation of a dependency filter provided by the present invention to show only instructions likely relevant to a troubleshooting problem.

Referring to FIG. 7, for example, rungs 1-6 may be present in the program 17 in rung order with rungs 1 and 3 producing output variables 66 A and C respectively that are consumed by rung 4. In turn rung 4 may produce an output variable D which is consumed by a rung 6 which invokes the fault condition 91. Rungs 2 and 5 do not contribute to data consumed at the given rung of the fault condition 91 and accordingly are not represented in the display 77. This filtering process reduces the instructions on the program 17 that must be reviewed for troubleshooting purposes and, by collecting them visually, reduces the complexity of the troubleshooting process.

Determining which rungs 62 contribute data to other rungs 62 may be done by referring to a connection list typically generated as part of the compilation process of the relay ladder logic program 17 as is understood in the art, but more generally, can be done by simply scanning through the program 17 to identify output variables and to cross-reference them to input variables on other rungs 62 according to standard sorting techniques well understood in the art.

Referring again to FIG. 5, at process block 90, once the rungs to be displayed in the display 77 are determined, the values of the physical inputs 72 and variables 68 and 66 associated with those rungs 62 may be displayed by referring to the fault time determined above (being the time associated with the event of the fault). The event log 19 is searched for the latest event times associated with each physical inputs 72 and variables 68 and 66 on the displayed rungs 62 (which may be program-proximate rungs or related rungs as described above). These values of the physical inputs 72 and variables 68 and 66 may be depicted near the graphic representations of the rungs 62 by various means including a highlighting of the rung or variable to indicate a true state for Boolean values or a numeric annotation for physical input values. Thus, for example, the value of the encoder 44 may be displayed within the limit-switch function block 64 of FIG. 3 as displayed in graphic display 77.

As noted, initially, the event number used to index this data of physical inputs 72 and variables 68 and 66 in the event log 19 will initially be the event number associated with the faulting instruction at event 74 (shown in FIG. 8) being the a priori event closest to the known fault. This event number 95 is shown in the control panel 78 of FIG. 6. At later steps in the troubleshooting process the event number used to index the data of the physical inputs 72 and variables 68 and 66 will change accordingly as will be described below.

Stepping Through Events

Referring now to FIGS. 5 and 6, at a decision block 92 the user may step through the control program 17 not by rung order but either forward or backward in the event log 19 only with respects to events that change an output 66 of an instruction 62. The number of events and amount of time in each step is variable and equal to the amount of time passing until the next change in output data of a rung 62 is detected. This restraint significantly limits the amount of data that must be reviewed without unduly constraining the troubleshooting process because all changes in input data that affect an instruction output (and hence the control program 17) can be reviewed, and typically only changes in input data that affect an instructions output are significant.

As indicated by process block 94, the user may step forward through the events (using an arrow button on the control panel 78 shown in FIG. 6) or as indicated by process block 96, backward through the events (using the opposite arrow button). This stepping is accompanied by an adjustment of the current event number 88 in the control panel 78 shown in FIG. 6. Alternatively, arbitrary stepping through the events 74 can be obtained by entering an event number 88 directly in the text box. Optionally, as the user steps through the events 74, the rung 62 related to the event 74 (by the event log 19) may be highlighted or centered within the display 77.

Referring now to FIGS. 6 and 8, while in one embodiment each step may move the user forward and backward a number of events 74 in the event log 19 that produce the next change in output data from a rung 62, this may be cumbersome to the extent that it reveals changes in output data that are unrelated to the faulting rung. For this reason, when the dependency button 81 is pressed, the stepping may be limited to those events 74 that change output data associated only with the filtered set of rungs 62 displayed in display 77. That is, the program steps only to events related to output data changes for rungs 62 providing outputs to variables 66 that contribute directly or indirectly to data consumed by the faulting rung 62. Thus, for the example of FIG. 7, starting at event 74 and moving backward by one step when the dependency button 81 is pressed, will cause those events 74 marked by an "X" (and related to rungs 62 not displayed on display 77 or that do not change output data) to be skipped and the displayed event will be an event 74' five events 74 earlier.

Referring momentarily to FIG. 3, in the example of trying to determine why the open flap fault occurred at rung 62d, the stepping process may be used to arrive at the event 74 at which the output variable 66 "flap detect" is set. An examination of the physical inputs of the limit-switch function block 64 display may show the following data of the lower limit 70, user-defined high limit 65, and physical input 72 as follows:

Lower Limit: 72.0
Test: 184.94363
High Limit: 185.0

Inspection of this data yields an indication that the open flap detection is in fact occurring at a physical input 72 of 184.94363, very close to the high limit (185.0). Referring to FIG. 2, the value of 185 is very close to the natural boundary of the product container. It therefore can be determined that slight variations in the tolerance or accuracy of the encoder 44 are causing the product container 50 itself to trigger zone C producing the erroneous fault condition. By capturing the physical input 72 at the time of the fault and at previous events, it may be determined that the limit-switch function block 64 on rung 62c needs a lower, user-defined high limit 65.

Referring again to FIGS. 5 and 6, in an alternative embodiment, the stepping of decision block 92 can be invoked by arrow buttons 96 on either side of the text box showing the value 87 of the output variable 66 indicated in by name 85 in a text box. This output variable 66 will initially be the faulting rung 62 but can be changed as one moves through events 74 is described above.

When buttons 96 are pressed, the next events displayed will be only events that produce the same change in the particular output value 66 having the name 85 displayed in the text box. In this way, a general trending of output variable 66 may be examined. Thus referring to FIG. 8, from event 74, a pressing of the back arrow button would cause the next event to be event 74" ten events before the faulting event 74.

Figure 9:
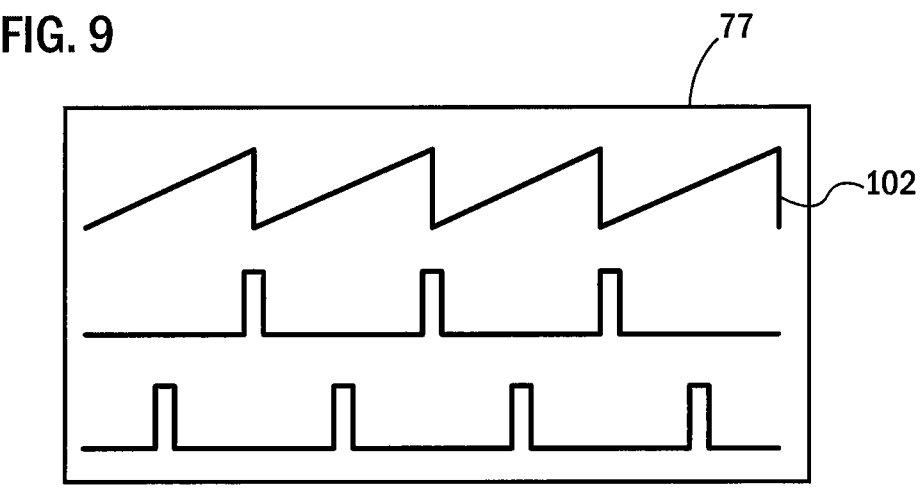
FIG. 9 is a graphical representation of physical inputs and control variables as a function of event numbers that may be displayed by the present invention.

Referring to FIG. 6, a more complete longitudinal study of an output variable 66 may be obtained by activating the radio button 100 in the control panel 78 to provide a graphical display shown in FIG. 9 plotting values of physical inputs 72 or output variable 66 as a function of event number 88. Thus, for example, the physical input 72 associated with the encoder 44 shown in FIG. 2 may be plotted as a graph line 102 as well as the output variable 66 from other rungs 62 to produce a timing diagram assisting in the determination of sources of error conditions.

Referring now to FIGS. 1, 4 and 6, the event number 88 of the event log 19 allows the display 77 to include additional time stamped data, for example data from historian units 34, providing high-speed video of the controlled process that may be displayed on a frame by frame basis in video inset 110 on the display 77. In this case, the time stamp video data may be stored in terms of a regular video file and accessed during the troubleshooting process or the video frames may be stored only at the event times in the data log itself.

Generally, as the user moves forward and backward by events 74 in the event log 19, the input and output data is changed to provide the current data with respect to the time of the current event. The particular rung 62 highlighted or having focus may also change according to whether the current event 74 relates to an output data for that rung 62. Likewise the name 85 of the variable in the text box may be updated together with its value 87.

In summary the invention allows the operation of the control program 17 to be reviewed not on a time basis, but on an event basis, where each event represents a change in output data of an instruction or rung. Further the events may be limited to changes in output data that directly affect a given rung 62 (as consumed by that rung 62), typically the faulting instruction, or the cause a particular change in a predefined output variable 66.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A computer program for troubleshooting a control program of a type comprised of instructions receiving input data from variables of the control program and measurements of physical inputs from an industrial process and providing output data to variables of the control program and output signals controlling the industrial process, the computer program fixed in a nontransient computer readable medium for execution on an electronic computer to:
   (1) output on a display associated with the electronic computer a representation of a first instruction showing a value of output data for the first instruction at a first time; and
   (2) accept a step instruction from a user changing the output on the display of the first instruction to jump to a second instruction at a second time;
   wherein the second instruction at the second time provides output data that is consumed directly or indirectly by the first instruction at the first time.

2. The program of claim 1 wherein the second time is a time of change of output data by the second instruction to a predetermined value provided by the user.

3. The program of claim 1 wherein the first instruction is an instruction producing output data triggering a detected fault of the computer program by a fault detecting element in the first instruction.

4. The program of claim 1 wherein the program further executes to identify other instructions providing output data received directly or indirectly by the first instruction and to output on the display the other instructions according to the identification, showing a value of at least one measurement of input data to the other instructions.

5. The program of claim 1 wherein the second time is limited to times of a change of output data by the second instruction of the control program.

6. The program of claim 1 wherein the program communicates with a program log providing a list of events recording changes of physical inputs from the industrial process only at times of change of the physical inputs.

7. The program of claim 6 wherein the events of the list are linked to a particular instruction providing a change of output data.

8. The program of claim 6 wherein the program log further includes a time stamp for each change of physical inputs and wherein the program further displays other time stamped data having a time stamp no later than the first time.

9. The program of claim 8 wherein the other time stamped data is video data of the industrial process.

10. The program of claim 1 wherein the program further executes to display the value of at least one measurement input or output data associated with the first instruction at multiple successive executions of the first instruction.

11. The program of claim 10 wherein the program further executes to display a graph depicting variations in the at least one measurement input or output data plotted against times of the multiple successive executions.

12. The program of claim 1 wherein changes of input or output data are stored in a circular buffer.

13. A program for troubleshooting a control program comprised of instructions receiving data from variables of the control program and measurements of physical inputs from an industrial process and providing outputs to variables of the control program and output signals controlling the industrial process, the program fixed in a non-transient computer readable medium for execution on an electronic computer to:
   (a) receive an output corresponding to a fault localized instruction associated with a failure of the control program;
   (b) review the control program to find other instructions providing outputs to variables received by the fault localizing instruction; and
   (c) outputting on a display associated with the electronic computer a representation of the fault localized instruction and the other instructions;
   wherein intervening instructions of the control program that do not provide outputs to variables that are directly or indirectly consumed by the fault localized instruction are omitted.

14. The program of claim 13 wherein the outputting of the fault instruction and the other instructions shows at least one physical input or variable of each instruction at a predetermined time during execution of the instructions.

15. The program of claim 14 wherein the program further executes to accept a step instruction from a user changing the output on the display of the fault instruction and the other instructions to show at least one measurement of a physical input from the industrial process or variable at a second time.

16. The program of claim 15 wherein the second time is before the predetermined time.

17. A method of troubleshooting a control program of a type comprised of instructions receiving input data from variables of the control program and measurements of physical inputs from an industrial process and providing output data to variables of the control program and output signals controlling the industrial process, the method employing an electronic computer executing a stored computer program and comprising the steps of:
  (1) outputting on a display associated with the electronic computer a representation of a first instruction showing a value of input data to the first instruction at a first time; and
  (2) accepting a step instruction from a user changing the output on the display of the first instruction to jump to a second instruction at a second time;
  wherein the second instruction at the second time provides output data that is consumed directly or indirectly by the first instruction at the first time.

18. The method of claim 17 wherein the second time is a time of change of output data by the second instruction of the control program.

19. The method of claim 18 wherein the second time is a time of change of the output data to a predetermined value provided by the user.

20. The method of claim 17 including the step of identifying other instructions providing output data that is directly or indirectly consumed by the input data, and outputting on the display the other instructions according to the identification, wherein intervening instructions of the control program not providing output data that is directly or indirectly consumed by the input data are omitted.

* * * * *